June 24, 1930. W. N. BOOTH 1,766,215
BRAKE DRUM
Filed April 12, 1926
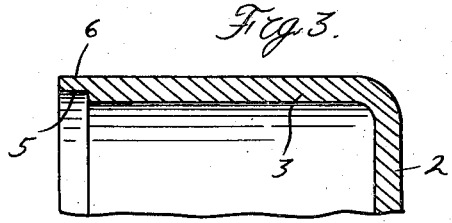
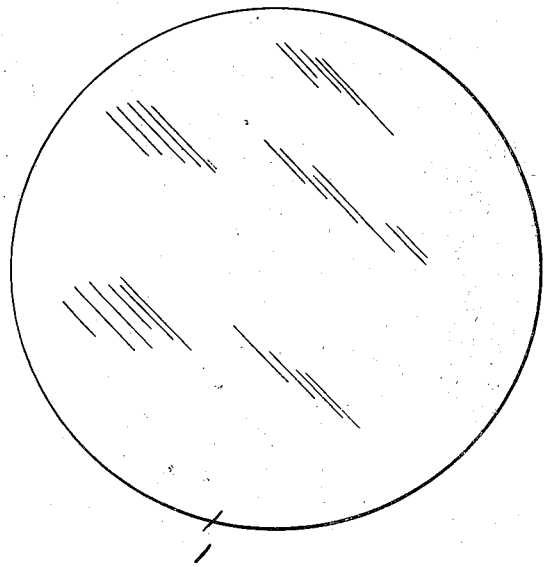
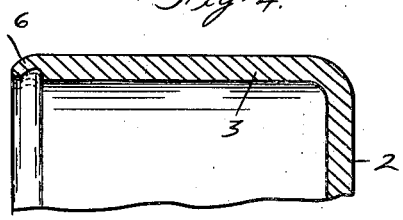
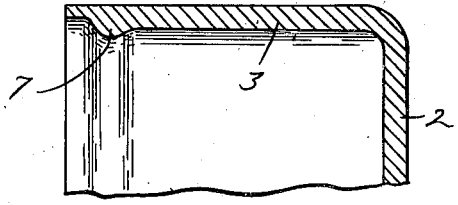
Inventor
William N. Booth
By
Attorneys Patented June 24, 1930

1,766,215

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

BRAKE DRUM

Application filed April 12, 1926. Serial No. 101,484.

The invention relates to brake drums and has for one of its objects the manufacture of a brake drum having a circular brake flange concentric with the axis of the brake drum. Another object is to provide means upon the brake flange for reinforcing and holding the same circular. With these as well as other objects in view the invention resides in the novel features as more fully hereinafter set forth.

In the drawings:—

Figure 1 is a plan view of a metal blank from which the brake drum is formed;

Figure 2 is a longitudinal section through the brake drum after the first operation upon the blank;

Figure 3 is a similar view showing the brake drum after the next operation;

Figure 4 is a similar view showing the finished brake drum;

Figure 5 is a similar view of a modified finished brake drum.

1 is a circular sheet steel blank of uniform thickness from which the brake drum is formed. This blank is drawn by suitable means such as a punch and die to form the drum with the web 2 and the circular brake flange 3, as shown in Figure 2. The edge portion 4 of the brake flange is reduced to form the terminal flange 6, as shown particularly in Figure 3. This may be effected by facing the brake flange and then undercutting the edge portion at 5 by a suitable machining operation or by an ironing operation by the punch and die used in forming the drum from the blank. The drum is then operated upon by a suitable punch and die to hold the brake flange 3 circular and concentric with the axis of the brake drum and at the same time to roll over the terminal flange 6 to form a reinforcing rib for the brake flange, as shown in Figure 4. This rib is hardened by the operation of the punch and die and operates to maintain the brake flange circular. Furthermore, the rib is located within the extensions of the inner and outer peripheries of the brake flange so that both internal and external brakes may be used.

To form the brake drum shown in Figure 5, the edge portion 4 of the brake flange 3 of the drum shown in Figure 2 is first faced and the drum then confined in a die and the edge portion operated upon by a suitable punch which swages the inner portion of the metal while the brake flange is held circular to form the annular rib 7 upon the inner periphery of the brake flange.

From the above description, it will be seen that the brake flange is formed with a reinforcing or stiffening rib while the brake flange is circular so that this stiffening rib holds the brake flange circular and takes care of any distortion which might be caused during the drawing of the sheet metal blank. It will also be seen that the rib upon the brake flange is hardened.

What I claim as my invention is:

1. A brake drum including a brake flange and a hardened rib formed on said brake flange for reinforcing and holding the same circular.

2. A brake drum including a brake flange and an annular rib upon said brake flange and between the extensions of the inner and outer peripheries of the same.

3. A brake drum including a brake flange and a hardened annular rib upon said brake flange and inclined relative thereto, said rib extending between the extensions of the inner and outer peripheries of the brake flange.

4. A brake drum including a brake flange and a rolled over terminal flange of less thickness than the brake flange constituting a rib upon said brake flange for reinforcing and holding the same circular.

5. A brake drum including a brake flange and a hardened terminal flange at the outer edge of said brake flange having a thickness less than that of said brake flange and extending transversely thereof to form a reinforcing rib for maintaining said brake flange circular.

6. A brake drum including a brake flange having a hardened extension upon one edge thereof spaced radially inwardly from the outer periphery of said flange and constituting an annular reinforcing rib for the brake drum.

7. A brake drum including a brake flange and a terminal flange upon the brake flange projecting inwardly from the outer periphery of the brake flange and constituting a reinforement for the brake drum.

In testimony whereof I affix my signature.

WILLIAM N. BOOTH.